March 2, 1965　　J. P. SCHOBER, JR., ET AL　　3,171,323
CONTROL APPARATUS
Filed June 25, 1962　　3 Sheets-Sheet 1

INVENTORS.
JOHN P. SCHOBER, JR.
ARTHUR W. SEAR
BY
ATTORNEY.

March 2, 1965  J. P. SCHOBER, JR., ET AL  3,171,323
CONTROL APPARATUS
Filed June 25, 1962   3 Sheets-Sheet 2
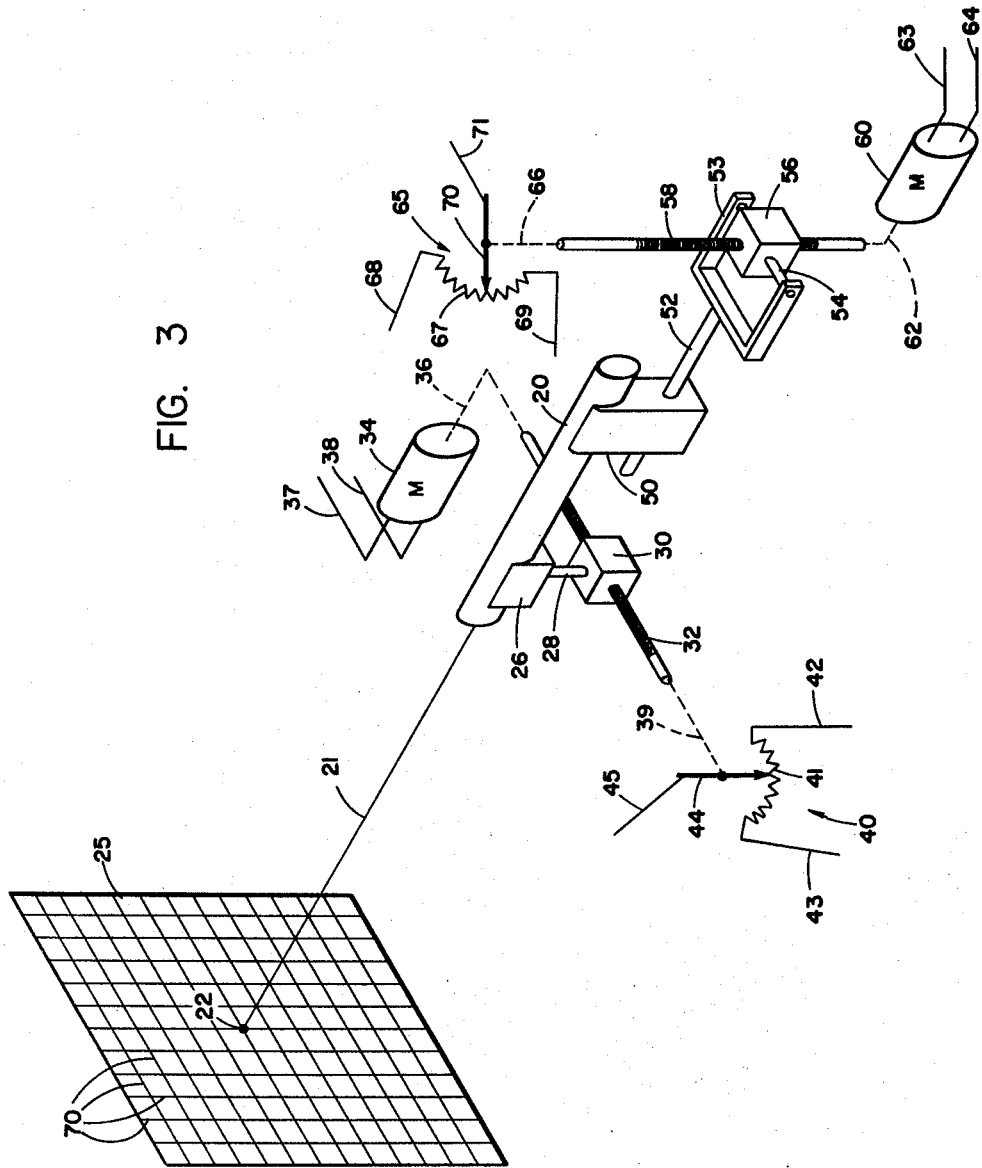
INVENTORS.
JOHN P. SCHOBER,JR.
ARTHUR W. SEAR
BY Charles J. Ingemach
ATTORNEY.

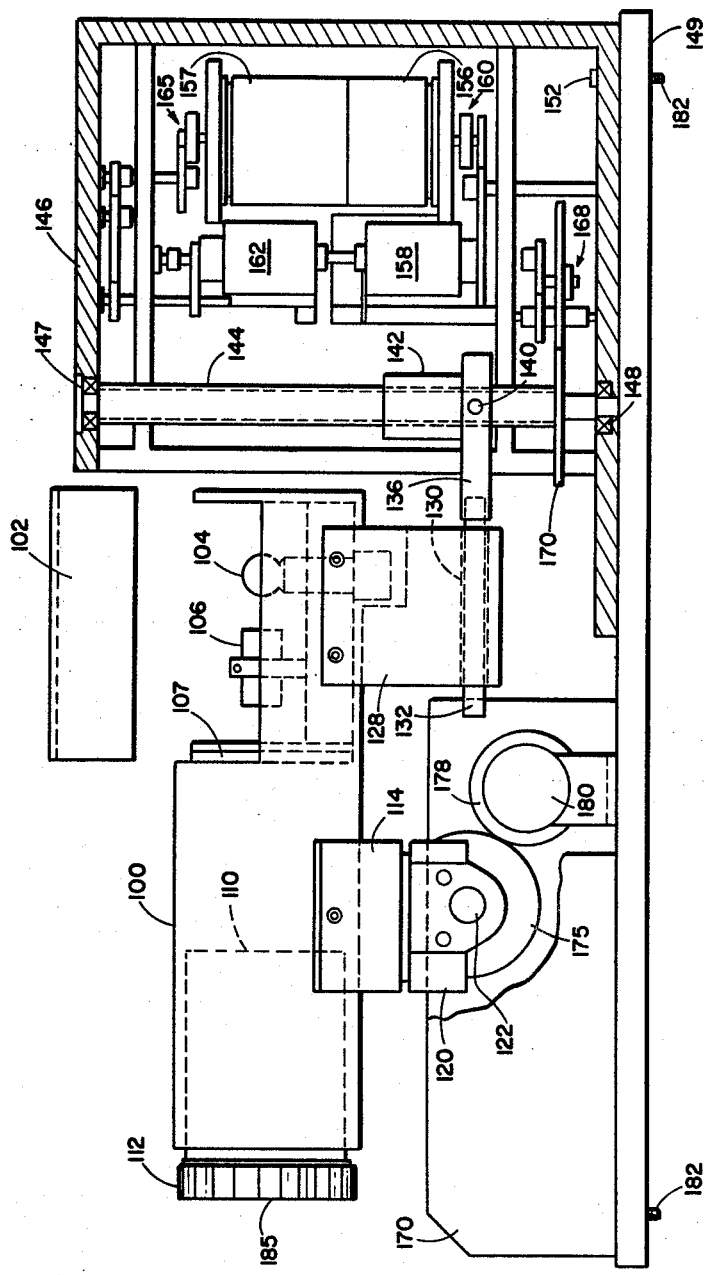

United States Patent Office 3,171,323
Patented Mar. 2, 1965

3,171,323
CONTROL APPARATUS
John P. Schober, Jr., Glendora, and Arthur W. Sear, Arcadia, Calif., assignors to Honeywell Inc., a corporation of Delaware
Filed June 25, 1962, Ser. No. 204,811
7 Claims. (Cl. 88—24)

This invention relates to control apparatus and more particularly to apparatus for controlling the position of an image on a remotely located projection surface so that the image is movable in each of two mutually perpendicular directions in response to first and second conditions respectively.

It is frequently desirable to project a beam of light onto a screen so that it appears as a spot and to move the spot horizontally in response to a first signal and vertically in response to a second signal. Such apparatus is useful for example in military operations where it is desired to show on a plotting board the relative positions of one or more targets with respect to a home station or craft. The plotting board may for example be divided into rectangular coordinates and the target image moved thereon to provide information concerning the relative bearings or positions of the targets. Likewise it is often desirable to simulate the positions of targets as for example, in war games or in training and teaching devices wherein the position of the targets is dictated by an instructor or supervisor. Electrical signals are usually created whose magnitude and sense are indicative of the correct X and Y coordinates of the target and projector apparatus responsive to these electrical signals is necessary to position an image of the target on the projection surface in such a manner that exact positional information therefrom is obtainable.

In the past systems have been provided which mount the projecting apparatus on a first axis and the projector is rotated about this first axis in accordance with one of the electrical signals. A second axis is then provided usually perpendicular to the first axis so that the projector may be rotated in a perpendicular direction in response to the other electrical signal. These prior systems have suffered a major disadvantage in that the projector, being rotated about a fixed axis, produces different amounts of displacement on the screen depending upon the distance of the image from the center of the screen. This problem may be overcome by characterizing the input signal in such a manner that unequal input signal changes produce equal displacement changes on the screen. However, characterized means are frequently inaccurate and are difficult to provide. It is desirable that equal increments of input signal produce equal displacements of the target on the screen without complicated characterization means and it is therefore an object of the present invention to provide a projection apparatus operable in response to electrical signals to move an image across a projection surface by an amount proportional to the input signal without the use of characterized means.

Briefly we overcome the problem by driving the projector so that one portion thereof moves parallel to the projection surface rather than in an arc. Thus a given increment of input motion produces a given amount of target movement regardless of the position of the target on the screen.

A more complete understanding of this invention will be obtained from a reading of the following specification, claims and drawings in which:

FIGURE 3 is a schematic representation of an embodiment of the present invention; and FIGURE 4 is a more complete showing of a practical embodiment of the present invention.

Figure 1:
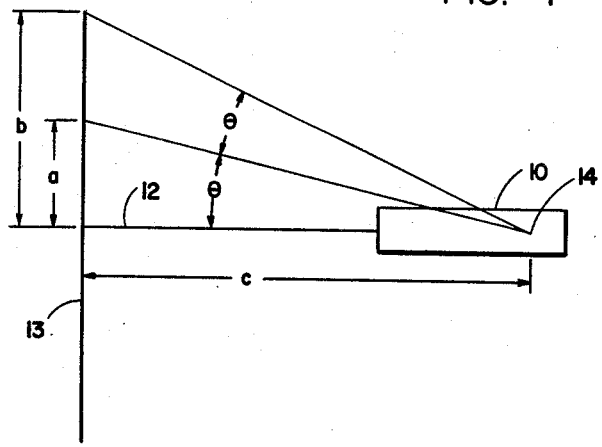
FIGURE 1 is a geometrical showing of the problems which the prior art encounters.

Referring to FIGURE 1 which shows a prior type device, an optical system is mounted on an assembly 10 to project a beam of light along a path 12 to a focus near the center of a projection surface or screen 13. By means not shown the assembly 10 is caused to rotate about a pivot 14 by an amount $\theta$ in response to a desired coordinate change. As seen in FIGURE 1 this causes the image on the screen 13 to move a distance $a$. A signal of twice this magnitude would cause the assembly 10 to rotate through an angle $2\theta$ and the position of the image would move a distance $b$. Since the input signals are of equal magnitude it is desirable that $b=2a$. However, from the drawing it is seen that $b=c$ sine $2\theta$ where $c$ equals the distance between the screen and the pivot axis of the assembly 10. $a=c$ sine $\theta$ so that, in general, $b\neq 2a$.

Figure 2:
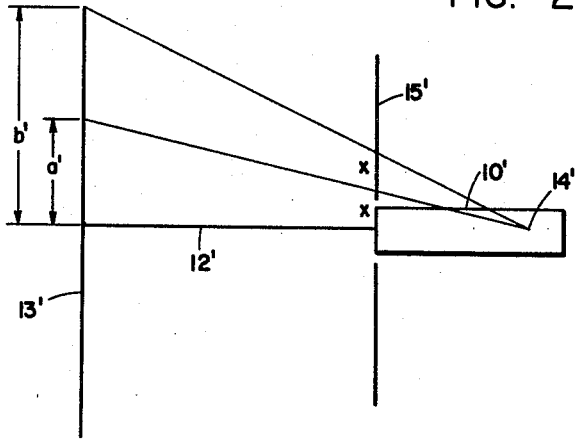
FIGURE 2 is a geometrical showing of the present invention.

This problem is overcome in the present invention as seen in FIGURE 2. As with FIGURE 1 an optical system is mounted in an assembly 10' so as to project an image along the beam 12' onto screen 13'. Assembly 10' is caused to move by means not shown about a pivot 14' somewhat the same as in FIGURE 1 although the amount of rotation in FIGURE 2 is not a function of the desired displacement as was the case in FIGURE 1. In FIGURE 2 the assembly 10' is caused to move in a direction parallel to screen 13' as along line 15', while it is pivoting about axis 14'. The amount of movement along line 15' is made proportional to the signal supplied so that when a signal of given magnitude moves at assembly 10' a distance X in FIGURE 2 the image on screen 13' moves to a positon $a'$, An additional signal of equal magnitude will cause the assembly 10' to move an additional amount X so that the position of the image on screen 13' moves to $b'$. By similar triangles it can be clearly shown that $b'=2a'$ and the desired objective is accomplished, that is, to move the image equal amounts with equal increments of input signals.

The apparatus for moving the assembly 10' in this manner will now be described with reference to FIGURE 3. A housing or assembly 20 is shown in FIGURE 3 which contains the optics necessary to produce a beam of light 21 and to create an image 22 on a projection surface 25. Housing 20 is connected to a bracket 26 near its front end which in turn is connected to a shaft 28. Shaft 28 is connected to a block 30 which is screw threaded to receive a screw 32. Shaft 28 operates as an axis for rotation of the housing 20 with respect to the block 30. Screw 32 is caused to rotate by a motor 34 connected to shaft 32 by gear trains or other mechanical connections shown generally as dash lines 36. Motor 34 has a pair of conductors 37 and 38 to receive a signal indicative of a first condition such as the amount of horizontal or X displacement desired for the target 22. Screw 32 is connected to a potentiometer 40 by a mechanical connection shown as dash line 39. Potentiometer 40 has a resistance winding 41 connected by a pair of conductors 42 and 43 to a source of voltage not shown. Potentiometer 40 also has a wiper 44 with a conductor 45 connected thereto which is operable by means not shown to rebalance motor 34 in a standard and conventional manner.

A block 50 is connected near the rear end of housing 20 and has an axial hole therethrough which is in slidable engagement with a shaft 52. Shaft 52 carries a yoke 53 containing a shaft 54 connected to a block 56. Shaft 54 acts as a pivot between yoke 53 and block 56. Block 56 is screw threaded to receive a screw 58 which in turn is rotated by a motor 60 through a gear train or other mechanical connection shown as dash line 62. Motor 60 has a pair of conductors 63 and 64 to receive a signal indicative of a second condition such as the desired amount of vertical or Y displacement of the image 22 on screen 25. Screw 58 is connected to a potentiometer 65 by mechanical connections shown as dash line 66. Potentiometer 65 has a resistance winding 67 connected to a source of voltage not shown by conductors 68 and 69. Potentiometer 65 also has a wiper 70 with a conductor 71 connected to apparatus not shown for rebalancing motor 60.

When it is desired to move the image 22 horizontally on the projector surface 25, a signal is presented to motor 34 on conductors 37 and 38. Motor 34 begins operating thus turning screw 32 and moving the wiper 44 of potentiometer 40 until a signal is created on conductor 45 of magnitude sufficient to rebalance motor 34. When screw 32 turns it moves block 30 which carries shaft 28 and bracket 26 thus moving the housing 20 in a direction parallel to surface of the projection screen 25. Screw 58 acts as a pivot for motion in this X direction and since this motion actually causes the housing 20 to move further away from the screw 58 some mechanical connection allowing relative displacement between housing 20 and shaft 58 must be provided. This is provided by the shaft 52 which slideably engages the block 50 connected to housing 20. Thus as screw 32 moves causing housing 20 to rotate about screw 58 as a pivot axial displacement occurs between shaft 52 and block 50 to accommodate this motion.

When movement of the image 22 in the vertical direction is desired a signal is presented to motor 60 on conductors 63 and 64. Motor 60 then turns screws 58 and potentiometer wiper 70 until a signal is present on conductor 71 of magnitude sufficient to create a rebalance signal for motor 60. As screw 58 turns block 56 is caused to move in a more or less vertical direction thereby carrying yoke 53, shaft 52, and block 50 and causing housing 20 to rotate about screw 32 as an axis.

It is thus seen that any desired coordinates may be presented to motors 60 and 34 which will in turn cause the image 22 to move to a spot indicative of these coordinates on projection surface 25. Projection surface 25 may be suitably enscribed with rectangular coordinates as shown by lines such as 70.

One problem arises in this system because of the fact that the drive screws 32 and 58 also act as the pivots for the system. This problem can be understood by observing that as block 30 moves along screw 32 block 56 is caused to rotate around screw 58. In so doing it moves along the threads of screw 58 which tends to move the block 56 up or down. Thus instead of describing a horizontal line on projection surface 25, image 22 will move at some slight angle with respect to the horizontal. In like manner as screw 58 turns block 56 moves generally up or down rotating block 30 around screw 32 as an axis. In rotating around screw 32 block 30 actually moves in a horizontal direction and so image 22 will not move exactly vertically on projection surface 25 but will move at some small angle with respect thereto. To overcome this problem we have inclined the axis of screw 58 by a small amount so that it is not actually vertical. By this expedient as block 56 moves along screw 58 it does not actually move vertically but rather moves a small amount horizontally at the same time. The inclination of the axis of screw 58 is chosen so that the amount of horizontal movement of block 56 in driving along screw 58 is made to compensate for the amount of horizontal movement of block 30 along screw 32 as screw 58 rotates. Likewise inclining the axis of screw 32 with respect to the horizontal can accomplish compensation for the amount of vertical movement of block 56 which accompanies horizontal movement of block 30. The amount of inclination or the projected angle between the axes of the two screws depends upon the distance between the two axes and the lead of the screws. For the practical embodiment which will be described in more detail with respect to FIGURE 4 wherein the distance from the projector to the projection surface 25 is about 32 feet, the distance between the axis of screw 32 and the axis of screw 58 is approximately 8 inches and the lead of the screws is 2 inches, inclination of the axis of screw 58 zero degrees 26 minutes with respect to the axis of screw 32 has been found sufficient to compensate for the error. Axial alignment of screw 32 to provide true horizontal movement of image 22 may be accomplished by means of adjusting screws on the whole projector assembly as will be described with regard to FIGURE 4.

In FIGURE 4 an embodiment of the present invention is shown in greater detail. A housing 100 is shown which contains the optics necessary to project a beam of light to the projection screen. A cover 102 is shown removed from the housing 100 to expose an incandescent light 104 and a condenser lens 106, and a reticle housing 107. The housing 100 also carries a projection lens shown by dash lines 110 and a filter cover 112. Connected to the housing 100 is a bracket 114 which is pivotly connected to a pivot ball nut member 120. Pivot ball nut 120 is threaded to engage a front lead screw 122. Rotation of lead screw 122 causes the projector housing 100 to move generally into and out of the plane of the drawing.

Connected near the rear of the housing 100 is a bracket 128 having a slot therethrough shown by dash lines 130 for receiving a yoke dowel pin 132. Yoke dowel pin 132 is connected to a yoke member 136 which contains a pivot shaft 140. Pivot shaft 140 is connected to a rear pivot ball nut 142 which threadedly engages a rear lead screw 144. Lead screw 144 is shown connected to a rear housing 146 by means of bearings 147 and 148. The rear housing 146 is made movable with respect to a base plate 149 by means of mounting screw 152. By removing mounting screw 152 the rear housing 146 can be slid on a base key way in base plate 149 parallel to the projection surface. This allows offsetting of the device from the center line of the projection surface without hampering the operation described. Likewise since this adjustment is available two or more projectors may be simultaneously used with the same projection surface so that a plurality of images can be formed thereon. Offset of the apparatus in a vertical direction may be accomplished by adjusting the rear pivot ball nut up or down as desired.

Contained within the rear housing 146 is a low speed motor 156 and a high speed motor 157. Low speed motor 156 is connected to a low speed clutch 158 by a gear train shown generally as 160. High speed motor 157 is shown connected to a high speed clutch 162 by a gear train shown generally as 165. Clutches 162 and 158 are connected to a gear train shown generally as 168 which is in turn connected to a gear 170 connected to the rear lead screw 144. Thus depending upon which of the clutches 162 or 158 is actuated rear lead screw 144 is driven by high speed motor 157 or low speed motor 156. The high and low speed clutch drives 158 and 162 operate to change the gear ratio between the drive motors and the lead screw from 125:1 to 1054:1 as an example in the preferred embodiment. Similarly high and low speed mechanisms are contained within a front housing 170 so as to move the front lead screw 122 at a fast or slow rate of speed as desired.

Connected to front lead screw 122 is an antiback lash gear 175 which in turn is connected to a gear 178. Gear 178 is connected to a potentiometer 180 so as to provide a feedback signal described with reference to FIGURE 3.

Base plate 149 is shown in FIGURE 4 as having adjusting screws 182. These adjusting screws are turned when operation is desired so that upon rotation of lead screw 122 the image on the screen is caused to move horizontally. Since the rear lead screw 144 has been properly inclined with respect to the vertical, the projector will move the image vertically on the screen upon rotation of shaft 144.

If it is desired to use more than one projector and to identify the separate images on the projection surface removable color filters 185 may be placed on each projector so that the images are color identified.

Thus it is seen that apparatus has been provided for projecting one or more images on a screen and causing them to move horizontally and vertically in direct proportion to input signals received. It is also seen that the projector is compensated for mechanical errors which occur as a result of utilizing screws as pivots. Many obvious modifications of the disclosed apparatus will occur to those skilled in the art and we do not desire to be limited by the specific disclosures utilized in describing the preferred embodiment. We intend only to be limited by the appended claims.

We claim:
1. Projector apparatus comprising, in combination:
   a first screw;
   a second screw;
   an optical system;
   means mounting said optical system on said first screw for movement in a first direction;
   and means mounting said optical system on said second screw for movement in a second direction, said first screw acting as a pivot for said optical system when said second screw causes movement in the second direction and said second screw acting as a pivot for said optical system when said first screw causes movement in a first direction.

2. Projector apparatus for use with a flat projection surface to project an image thereon which moves in a first direction in accordance with a first signal and which moves in a second direction perpendicular to the first direction in accordance with a second signal comprising, in combination:
   means moving said projector apparatus along a first line substantially parallel with said projection surface and about a first pivot axis in accordance with the first signal so that the image moves in the first direction on the projection surface;
   and means moving said projector apparatus along a second line substantially parallel with said projection surface and about a second pivot axis in accordance with the second signal so that the image moves in the second direction on the projection surface.

3. Apparatus according to claim 2 wherein the first line and the second pivot axis are collinear and wherein the second line and the first pivot axis are collinear.

4. Projector apparatus for use in projecting and moving an image in each of two mutually perpendicular directions across a flat projection surface in accordance with two condition indicative signals comprising, in combination:
   optical means operable to project the image on the projection surface;
   a first screw;
   a second screw;
   means mounting said optical means on said first screw for movement along said first screw when said first screw turns;
   means mounting said optical means on said second screw for movement along said second screw when said second screw turns, said second screw acting as a pivot for said optical means when said optical means moves along said first screw, said first screw acting as a pivot for said optical means when said optical means moves along said second screw;
   and means driving said first and said second screws in accordance with first and second conditions respectively.

5. Apparatus according to claim 4 wherein the first and second screws are arranged substantially parallel with the screen and planes passing through the axes of said screws perpendicular to the projection surface describe an angle of less than 90°.

6. Projector apparatus for use with a plane projection surface comprising, in combination:
   an optical system having first and second end portions and being operable to direct a beam of light towards the projection surface;
   first means mounting the first end portion of said optical system for movement in a first direction substantially parallel to the projection surface;
   second means including slideable means mounting the second end portion of said optical system for movement in a second direction substantially parallel to the projection surface, said slideable means operable to allow movement between said second means and said optical system in a direction substantially parallel to a beam of light from said optical system to the projection surface;
   first drive means connected to said first means and operable to move the first end portion of said optical means in the first direction in response to a first condition;
   and second drive means connected to said second means and operable to move the second end portion of said optical means in the second direction in response to a second condition.

7. Apparatus for use with a flat projection surface comprising, in combination:
   an optical system for projecting an image on the surface;
   a first screw having an axis extending in a first direction substantially parallel with said surface;
   a second screw having an axis extending in a second direction substantially parallel with said surface;
   means for driving said second screw in accordance with a second condition;
   means mounting said optical system for movement by said first screw in the first direction and about the axis of said second screw as a pivot;
   means including relative motion means mounting said optical system for movement by said second screw in the second direction and about the axis of said first screw as a pivot, said relative motion means operable to allow relative motion between said optical means and said second screw as said optical means moves in the first and second directions, movement of said optical means in the first and second directions by said first and second screws respectively being accompanied by movement of said optical means in the second and first directions respectively as a result of rotation of said optical means about the axes of said second and first screws respectively;
   and means mounting said first and second screws so that planes passing through the axes thereof perpendicular to the projection surface describe an angle less than 90° by an amount necessary to compensate for the motion of said optical means in the first and second directions when being moved in the second and first directions by said second screw and said first screw respectively.

References Cited by the Examiner
UNITED STATES PATENTS

| | | | |
|---|---|---|---|
| 2,143,011 | 1/39 | Juhasz | 88—24 |
| 2,395,351 | 2/46 | Sohn | 235—61 |
| 2,466,758 | 4/49 | Barton | 88—24 |
| 2,918,343 | 12/59 | Guillot | 88—24 |
| 2,930,668 | 3/60 | Behrmann et al. | 88—24 |

NORTON ANSHER, *Primary Examiner.*

EMIL G. ANDERSON, *Examiner.*